Figure 3:
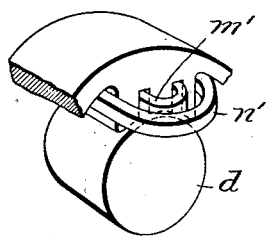

A. SCHERBIUS.
STABILIZED COMMUTATOR MACHINE.
APPLICATION FILED AUG. 1, 1910.

1,164,223.

Patented Dec. 14, 1915.
2 SHEETS—SHEET 1.

WITNESSES:

INVENTOR:
ARTHUR SCHERBIUS,
BY
HIS ATTORNEY.

UNITED STATES PATENT OFFICE.

ARTHUR SCHERBIUS, OF BADEN, SWITZERLAND, ASSIGNOR TO GENERAL ELECTRIC COMPANY, A CORPORATION OF NEW YORK.

STABILIZED COMMUTATOR-MACHINE.

1,164,223.  Specification of Letters Patent.  Patented Dec. 14, 1915.

Application filed August 1, 1910.  Serial No. 574,804.

*To all whom it may concern:*

Be it known that I, ARTHUR SCHERBIUS, a subject of the German Emperor, and residing at Hotel Belvedere, Baden, Switzerland, have invented certain new and useful Improvements in and Relating to Stabilized Commutator-Machines, of which the following is a specification.

This invention relates to the regulation of dynamo electric machinery and more particularly to the stabilizing of alternating current commutator machines.

It has heretofore been proposed to regulate the speed of induction motors by connecting up commutator motors to the slip-rings of the same, the voltage of these commutator motors being regulated, so that the electromotive force opposed to the rotor voltage causes more or less reduction of speed of the main motor. It is desirable to regulate induction motors above as well as below synchronous speed as then a greater range of regulation can be obtained for the same size of machine or apparatus. In order to be able to do this it is necessary to regulate from hypo-synchronism to hyper-synchronism, which means, however, that the synchronism point must be passed. If, however, the induction motor runs synchronously then there is no voltage on its slip rings so that there no longer exists any relation between the phase of the field of the induction motor and the phase of the current produced by the commutator motor, that is to say the whole arrangement is in unstable equilibrium and it is not possible to regulate beyond the synchronous speed. This can only be effected when the commutator motor may be made to run as a generator independently of any fixed definite voltage. Now, in order that the same may run as a generator it must work on the magnetizing curve above the knee. Near synchronism, however, the voltage of the commutator motor is very low, so that the field of the commutator motor is not saturated and the machine cannot consequently work stably as a self-exciting machine. Now the stabilizing of a self-excited alternating current commutator machine is normally effected by saturation just as in the case of direct current machines. If however self-excited commutator machines are required to work with a voltage varying within wide limits, then for the lower voltages the stabilizing is only rendered possible by the employment of special auxiliary means. For quite a number of applications of such machines it is absolutely necessary to stabilize the machines at various voltages.

The object of the present invention is to produce at any desired point of the voltage range a stable condition so that the commutator machine can run stably as a self-exciting machine.

This invention in brief consists in stabilizing shunt wound self excited alternating current commutator machinery by preventing variations of the exciting flux proportional to the variations of terminal voltage. I attain this result in various ways. By interposing a transformer between the brushes and field windings and designing the transformer primary to saturate at low voltages, I obtain the effect of saturation in the field windings. The voltage at which the stabilizing occurs can be varied by varying the magnetic circuit coacting with the transformer windings as by altering the air gap of the transformer, thus producing an artificially increased leakage. Similarly, the voltage at which stabilizing occurs can be varied by a magnetic shunt to the main field, thereby producing an artificially increased leakage of the main flux. The effect of saturation can also be obtained by inserting a resistance having a positive temperature coefficient between the brushes and field windings. Actual saturation can be obtained by varying the magnetic circuit coacting with the exciting coils. This may be attained by varying the iron path, as by an adjustable iron piece moving in a slot in the field pole, or by using two coils arranged either concentrically or side by side.

Figure 6:
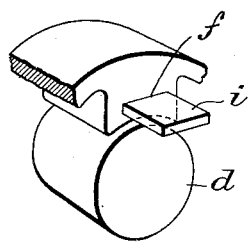
Figure 4:
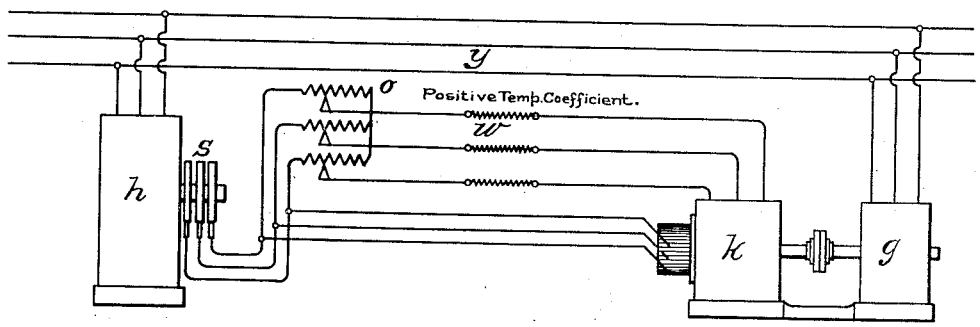
Figure 1:
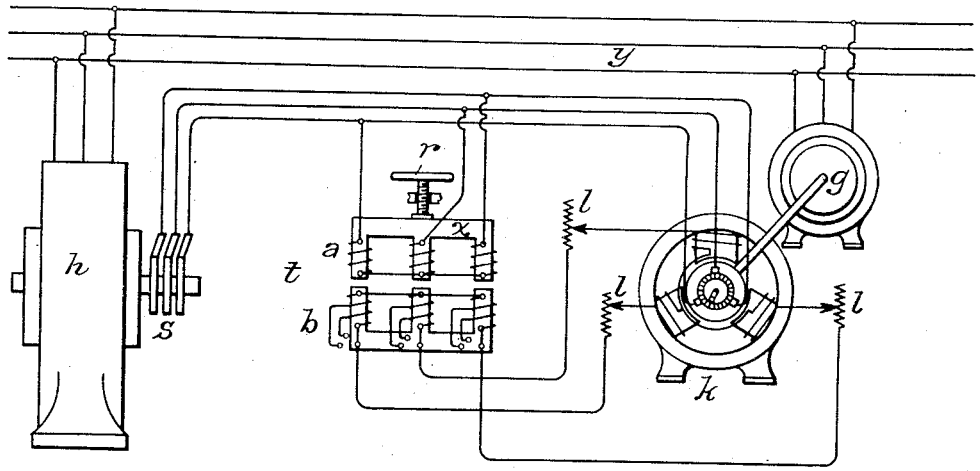
Figure 4:
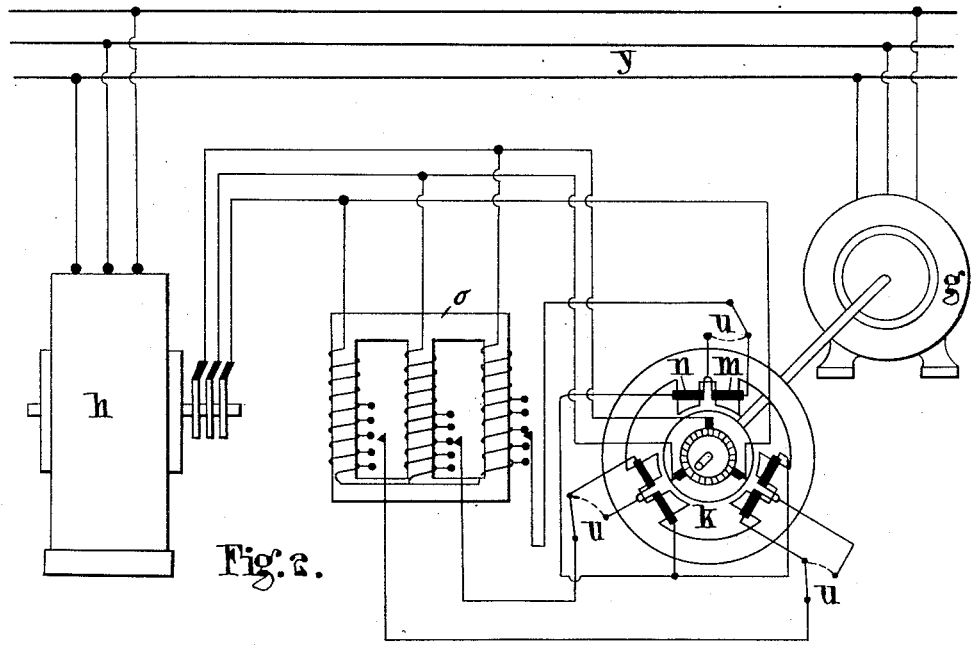
Figure 5:
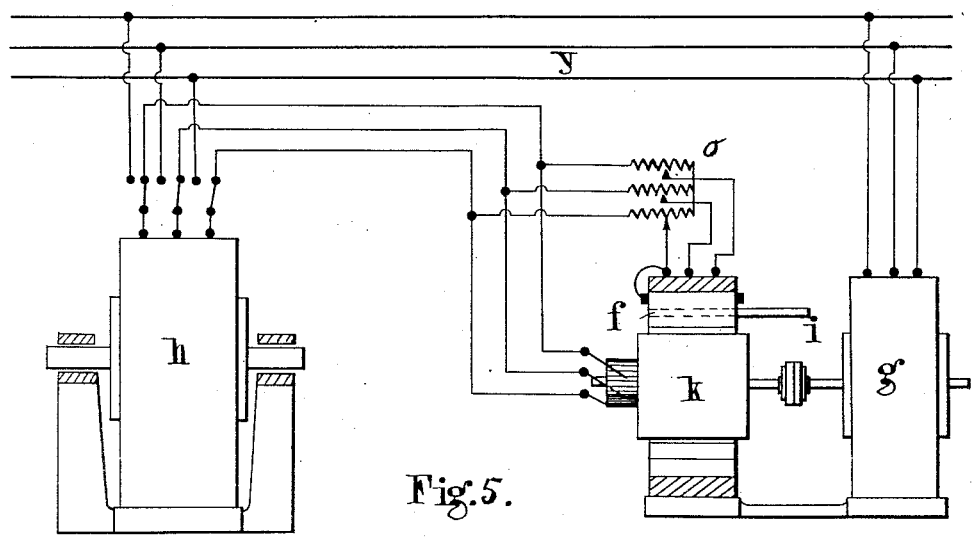

Referring to the accompanying diagrammatic drawings: Figure 1 shows an arrangement in which a transformer with variable air gap and subsidiary adjustable resistances are arranged in the exciting circuit of a commutator machine connected to the slip rings of an asynchronous machine. Fig. 2 represents a modification of this arrangement in which the exciting current for the commutator machine may be distributed in coils not concentric. Fig. 3 is a fragmentary view illustrating an arrangement in which two exciting coils are arranged concentrically. Fig. 4 shows a modification where resistances having a positive temperature coefficient are arranged in the exciting circuit of a commutator machine arranged as in Fig. 1. Fig. 5 is a further modification in which adjustable iron pieces are fitted into slots in the poles of the commutator machine. Fig. 6 is a detail view of the pole piece of the machine shown in Fig. 5.

In carrying the invention into effect according to Fig. 1 the self-excited alternating current commutator machine $k$ is mechanically coupled to a dynamo electric machine $g$ capable of running as a motor extracting energy from the mains $y$ or as a generator supplying energy thereto. The field windings of the machine $k$ are connected through the intermediary of regulating resistances $l$ and the transformer $t$ to the brush leads of the machine $k$ which are also connected to the slip-rings $s$ of the asynchronous machine $h$ whose regulation is being effected.

In operation when the main motor is running below synchronism its rotor supplies current to the machine $k$ which runs as a shunt excited motor and drives $g$ as a generator feeding current back to the mains. Regulation of the speed of the main motor is effected by varying, as by means of the subsidiary resistances $l$ the excitation and hence counterelectromotive force supplied by the machine $k$. When the neighborhood of synchronism is reached the slip energy becomes extremely small and in order that the machine $k$ may continue to work stably as a self excited machine, the core $x$ is designed to saturate at very low voltages. The current supplied to the machine $k$ by the rotor of the main motor is reduced until the commutator machine ceases to drive the machine $g$ and instead is itself driven as a generator thereby, and energy taken from the mains instead of vice versa as before. The main motor may now be run above synchronism by being supplied with rotor currents from the generator $k$ driven by the motor $g$ fed from the mains and the speed of the main motor may be regulated as before by varying the excitation of machine $k$. The iron of the part $x$ of the transformer bearing the winding $a$ should be of such dimensions that even with low voltages it is highly saturated, then because of the leakage the flux through the coil $b$ will increase more slowly than through the coil $a$, consequently also the flux of the machine will increase more slowly than the terminal voltage: there thus occurs a stable condition at a definite terminal voltage. The voltage at which the stabilizing occurs can be varied by altering the air gap as by the hand wheel $r$. If the air gap be reduced to zero then the voltage at which saturation occurs is determined by the saturation point of the machine. The machine $k$ is driven at approximately constant speed by the machine $g$ and its voltage and frequency may be varied in any suitable manner.

According to the modification indicated in Fig. 2 the stabilizing action is produced within the machine $k$ the transformer $o$ being employed in this case for regulation only. The stator of the machine $k$ is provided with two adjacent exciting coils $m$ and $n$ per pole, switches $u$ being arranged to connect in circuit one or both coils alternatively. If desired, the exciting coils may be arranged concentrically as in Fig. 3 in which case with small flux only the inner coil $m'$ is used, the flux being then considerably concentrated and the resulting saturation of this spot stabilizes the machine. For higher voltages the outer coil $n'$ is used and then the whole cross-section of the pole is available for the flux.

Fig. 4 illustrates an arrangement in which modified stabilizing means $w$ are employed external to the machine $k$. These means comprise resistances having a positive temperature coefficient. That is to say, the effect of these resistances increases with rise of temperature, thus producing an effect similar to that of saturation. The transformer $o$ is provided merely for regulation as before.

In the modification according to Fig. 5 the stabilizing means are also embodied in the machine $k$ a transformer $o$ being provided as before for the purpose of regulation only. The poles of the machine $k$ are formed with suitable slots which may be partly or wholly filled by means of an iron piece $i$ adapted to slide therein and thus vary the point at which pole saturation will occur. In this figure the machine $h$ is arranged to be started by current supplied by the machine $k$ being afterward disconnected therefrom and connected direct to the mains.

The construction of the poles with the slot $f$ and sliding piece $i$ may be gathered from Fig. 6.

The advantages of the artificial stabilization of the machine may be seen from the following considerations. The commutator machine, which is connected up in the manner indicated is generally of such dimensions, that it can absorb the maximum slip energy, consequently its dimensions depend directly on the scope of the regulation. Thus, if it is possible to allow the main motor to run hyper-synchronously as well as hypo-synchronously then for an equal scope of regulation the commutator machine may be made much smaller, because when the main motor is running hypo-synchronously it works as a motor, whereas when running hyper-synchronously it works as a generator.

Besides the above mentioned advantage of smaller dimensions there is also a second equally important advantage, namely the possibility with equal scope of regulation of working with a much smaller frequency in the commutator machine, whereby as is known, the transformer voltages will be considerably reduced in the short circuited brushes and the like. With similar advantages machines stabilized according to the above described process may be utilized as starting machines for commutator-less (synchronous or asynchronous) motors. When starting the applied voltage must necessarily be low and be capable of variation to the normal value and this is only possible by stabilizing the commutator machine at all voltages according to the present application; at the same time the frequency of the generators used as starting machines may be varied, for example, by means of various phase combinations in the exciting circuit. Thus it is possible to adjust voltage and periodicity independently and attain starting under the most favorable conditions without employing exciting machines for the starting generators and without during the starting process, having to accelerate a starting machine of large mass. A machine self-excited and stabilized in the present manner may, however, also be utilized as an exciting machine for a commutator starter generator so that with constant speed of the main exciting machine, current at variable voltage and periodicity can be obtained therefrom, as described in the patent to Stanley, #783,708.

It will be understood that the arrangements indicated above are merely given by way of example and that any arrangements are included in the present application, employing the general process of stabilizing self-excited commutator dynamo electric machinery by preventing the proportional increase of flux and terminal voltage within the whole voltage range of the machine.

Having now described my invention what I claim as new and desire to secure by Letters Patent is:—

1. In combination, a self-excited dynamo electric machine comprising a commuted winding, an exciting winding electrically connected thereto, and a field structure carrying said exciting winding, and means interposed between said commuted winding and said exciting winding for preventing variations of flux in said field structure proportional to the variations of terminal voltage.

2. In combination, a dynamo electric machine comprising a commuted winding, an exciting winding electrically connected thereto, and a field structure carrying said exciting winding, and means interposed between said commuted winding and said exciting winding for preventing an increase of flux in said field structure proportional to the increase of terminal voltage.

3. In combination, a dynamo electric machine comprising a commuted winding and an exciting winding electrically connected thereto, a transformer, comprising primary and secondary windings, interposed between said commuted winding and said exciting winding, and means for varying the magnetic circuit coacting with one of said windings so that the flux produced by the exciting winding shall not vary proportionally to the terminal voltage.

4. In combination, a dynamo electric machine comprising a commuted winding and an exciting winding electrically connected thereto, a transformer, comprising primary and secondary windings, interposed between said commuted winding and said exciting winding, and means for varying the magnetic circuit within the windings of said transformer so that the flux produced by the exciting winding shall not vary proportionally to the terminal voltage.

5. In combination, a dynamo electric machine comprising a commuted winding and an exciting winding, a transformer having a primary winding and a secondary winding on separate cores, one of said transformer windings being electrically connected to said commuted winding and the other of said transformer windings being electrically connected to said exciting winding, and means for varying the magnetic leakage between said cores.

6. In combination, a dynamo electric machine comprising a commuted winding and an exciting winding, a transformer having a primary winding and a secondary winding on separate cores, one of said transformer windings being electrically connected to said commuted winding and the other of said transformer windings being electrically connected to said exciting winding, and means for varying the magnetic leakage between said cores comprising means for varying the air gap therebetween.

7. In combination, a dynamo electric machine comprising a commuted winding and an exciting winding, a transformer having a primary winding and a secondary winding on separate cores, one of said transformer windings being electrically connected to said commuted winding and designed to substantially saturate its core at all terminal voltages of said dynamo electric machine, and the other of said transformer windings being electrically connected to said exciting winding, and means for varying the magnetic leakage between said cores.

In testimony whereof, I affix my signature in presence of two witnesses.

ARTHUR SCHERBIUS.

Witnesses:
 AUGUST RUEGG,
 A. ROPINSKY.